Feb. 7, 1961 R. C. KENNEDY 2,971,047

COMPOSITE PICTURE SIGNAL TRANSMISSION SYSTEMS

Filed March 23, 1956 4 Sheets-Sheet 1

KEY TO FIG. 1.

INVENTOR.
Ralph C. Kennedy
BY
[signature]
ATTORNEY

COMPOSITE PICTURE SIGNAL TRANSMISSION SYSTEMS
Filed March 23, 1956 4 Sheets-Sheet 2
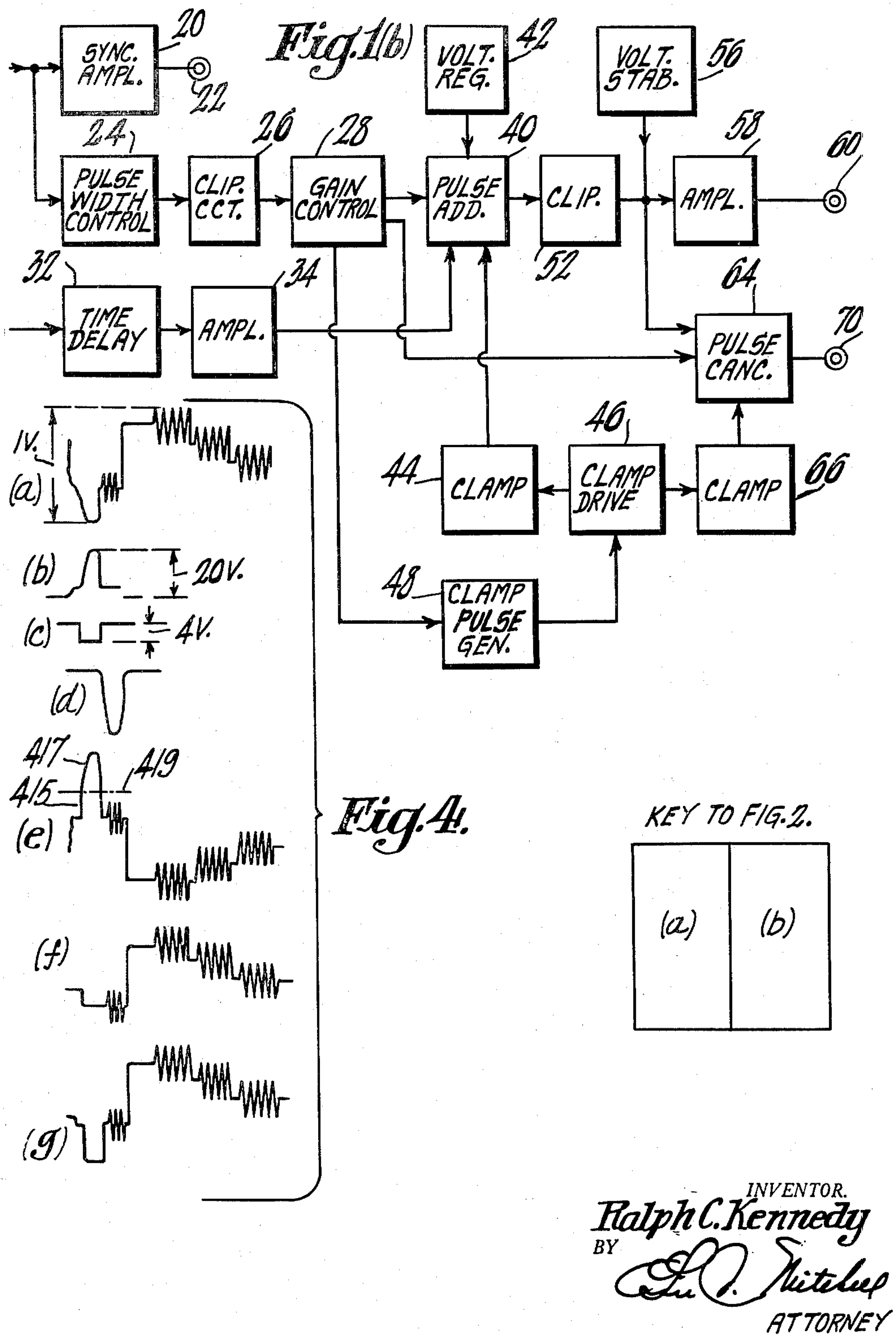
Fig. 1(b), Fig. 4, KEY TO FIG. 2.
INVENTOR.
Ralph C. Kennedy
BY
ATTORNEY Feb. 7, 1961 R. C. KENNEDY 2,971,047

COMPOSITE PICTURE SIGNAL TRANSMISSION SYSTEMS

Filed March 23, 1956 4 Sheets-Sheet 3

INVENTOR.
Ralph C. Kennedy
BY
[signature]
ATTORNEY

Feb. 7, 1961 R. C. KENNEDY 2,971,047

COMPOSITE PICTURE SIGNAL TRANSMISSION SYSTEMS

Filed March 23, 1956 4 Sheets-Sheet 4

INVENTOR.
Ralph C. Kennedy
BY
[signature]
ATTORNEY

United States Patent Office 2,971,047

Patented Feb. 7, 1961

2,971,047

COMPOSITE PICTURE SIGNAL TRANSMISSION SYSTEMS

Ralph Craig Kennedy, Queens Village, N.Y., assignor to Radio Corporation of America, a corporation of Delaware Filed Mar. 23, 1956, Ser. No. 573,492

5 Claims. (Cl. 178—5.4)

Figure 1A:
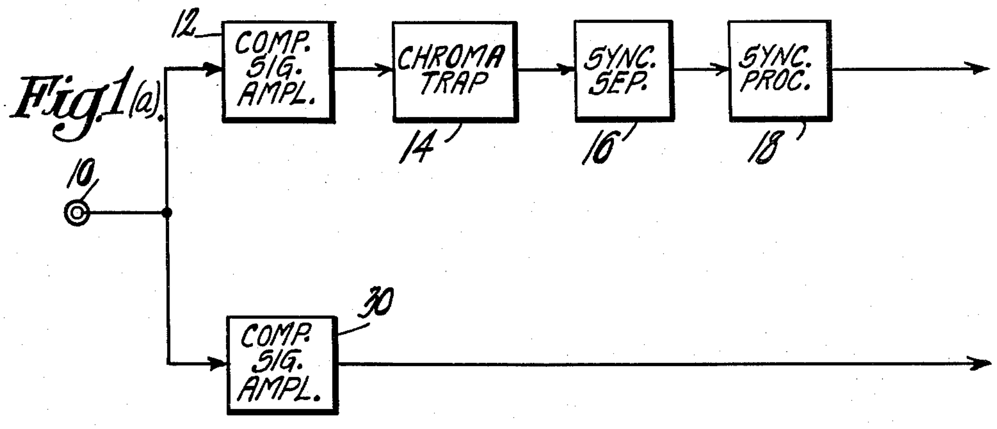

The invention relates to composite picture signal transmission systems and it particularly pertains to circuit arrangements for processing and eliminating undesired disturbances in composite color signals.

The composite black-and-white, or monochrome, television signal broadcast in accordance with existing U.S. standards comprises a luminance signal and deflection synchronizing pulses. In addition, the composite color signal broadcast in accordance with U.S. standards, set forth in Federal Communications Commission, Public Notice No. 53–1663, of December 17, 1953, comprises a chrominance signal and color bursts. The luminance signal is intended to have exclusive control of the luminance of the reproduced image whether conveyed by the black-and-white, or monochrome transmission or by color transmission. The deflection synchronizing pulses are used to control the scanning of the electron beam forming the raster on the face of the kinescope in synchronism with the scanning of the electron beam in the color television camera.

The chrominance signal, which is peculiar to color television, comprises the modulation sidebands of a chrominance subcarrier of frequency in the higher luminance signal frequency band and which are added to the luminance signal in order to effectively reproduce the televised image in full color. The color bursts comprise approximately eight or nine cycles of unmodulated sine wave of chrominance subcarrier frequency and of reference phase which follow the horizontal deflection synchronizing pulses. These color synchronizing bursts are transmitted for controlling the synchronization of the receiver color demodulating circuitry by which the chrominance subcarrier is properly demodulated to derive the chrominance signal. The amplitude of the color bursts before being modulated onto the visual carrier wave is approximately the same as that of the deflection synchronizing pulses. As modulated onto the blanking pedestals of the visual carrier wave, the color synhcronizing bursts swing symmetrically above and below the black level, during the latter part of the blanking interval, termed the *back porch* by the artisan.

In present day television broadcasting systems, it is frequently desired to replay the composite picture signal from one point to another for further processing. This relaying operation often may subject the composite picture signal to various types of interference effects which tend to distort portions, or all, of the composite signal and often may attenuate the signal to such an extent that the amplitude level may be too low for the signal to be used directly. In such instances, a video signal *stabilizing amplifier,* popularly referred to as a *stab-amp,* is used to modify the composite picture signal as received from the remote point. In general, such stabilizing amplifiers include circuits for suitably amplifying the picture signal, for restoring the deflection synchronizing pulses to their proper forms and amplitudes, and for removing low frequency disturbances such as tilt, surges and hum.

There is a necessity, both in monochrome and polychrome television broadcasting, to lock the sources of synchronizing signals together so that programs may be created by switching from one studio to another, introducing commercials, which are usually on film, and by utilizing special effects, any of which may be generated at either the same location or at widely different locations. The particular form of synchronizing in conventional use has been termed *genlocking.* In black-and-white television studios the deflection synchronizing pulses are readily stripped from the composite monochrome signal and used to lock the synchronizing pulse generators together, while the picture signal, free of deflection synchronizing pulses, is introduced into the studio switching system in the same manner as though it originated directly from a television camera. Special stabilizing amplifiers have been developed for color television broadcasting, but there has been difficulty in extracting the deflection synchronizing pulses from the composite color signal without distorting the color bursts, which as previously mentioned, extend on both sides of black level. Frequently in order to broadcast acceptable color television signals and utilize the genlocking principle, two wide band circuits have been used for each program. One circuit is used to transmit deflection synchronizing pulses and color bursts to lock the synchronizing signal generators, while the other wide band circuit is used solely to transmit the picture information. It is desirable that the same stabilizing amplifier apparatus be used for both monochrome and polychrome composite signals without change when switching from one type of signal to another, and of course, it is desirable to save the expense of the extra wide band circuit formerly required for distance transmission. Furthermore, when live pickups have been attempted in color, the blanking pedestal has been found to be so difficult to control with the existing equipment that color bursts and chrominance signals have been distorted in passing through the conventional transmission circuits, especially when passing over coaxial cables for long distances.

An object of the invention is to recover the deflection synchronizing pulses from an incoming composite picture signal, be it either monochrome or color, without distorting the remainder of the picture signal.

Another object of the invention is to provide an improved circuit arrangement for processing both monochrome and polychrome composite video signals for transmission over a single wideband transmission circuit.

A further object of the invention is to provide an improved circuit arrangement for accurately setting the amplitude of the blanking pedestal in both monochrome and polychrome television signal transmission.

According to the invention, a composite monochrome or polychrome television signal, appearing at the input terminals of a signal transmission system, is applied to apparatus for separating the deflection synchronizing pulses from the composite signal. The separated deflection synchronizing pulses are shaped and amplified as required for subsequent application to utilization apparatus located in the studio. Other circuitry is provided for reproducing the deflection synchronizing pulses with cleanly clipped tips, and for varying the location of the trailing edges and the amplitude. The composite signal is also applied to apparatus for amplifying and adjustably delaying the signal. The delayed composite signal and the reproduced pulses are applied to adding circuitry in relative polarity at which the deflection synchronizing pulses of the delayed composite signal are reinforced by the reproduced pulses, whereby the distortion is effectively elevated to the extremities of the newly formed pulses. The reproduced and the distorted synchronizing pulses are phased by adjusting the composite signal delaying means to make the leading edges of corresponding pulses coincide and by adjusting the width of the reproduced pulses to make the trailing edges of the corresponding pulses coincide. The reinforced pulses are then applied to apparatus for clipping the pulses below the level at which distortion appears, leaving a composite signal having processed deflection synchronizing pulse components for application to suitable utilization apparatus.

Further, according to the invention, the processed deflection synchronizing pulses may be eliminated from the composite signal leaving the color burst and picture components together with a stabilized blanking pedestal by applying the processed composite signal and the reproduced pulses to algebraic adding circuitry in relative polarity at which the two pulse components just cancel each other. The leading edges of deflection synchronizing pulses of the composite signal to be cancelled and the reproduced cancelling pulses are in phase due to the previous adjustment of the time delay circuitry, while the trailing edges of the two pulses are in phase due to the previous width adjustment of the cancelling pulses. By simple amplitude adjustment of the cancelling pulses, the deflection synchronizing pulses are precisely and cleanly removed from the processed composite signal. The resultant signal is a color burst and picture signal with processed blanking pedestals, ready for application to a conventional monochrome or color television studio switching system.

Figure 3:
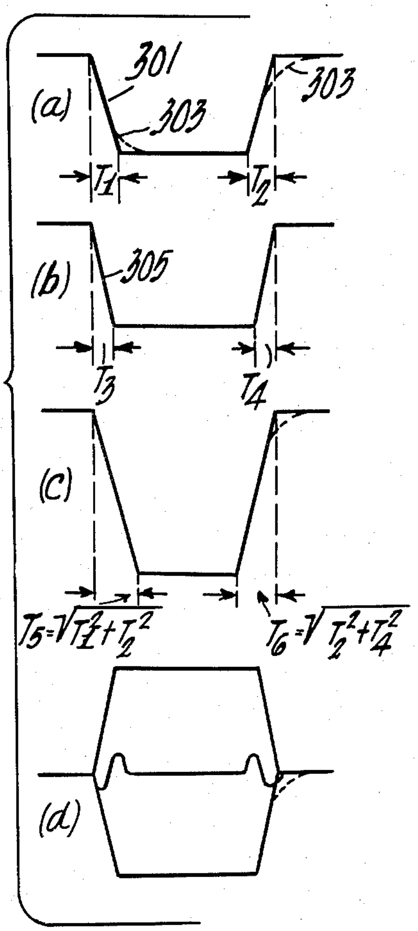
Figure 3:
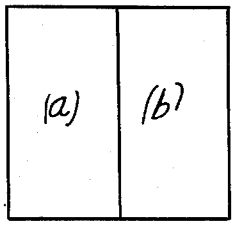
Figure 2A:
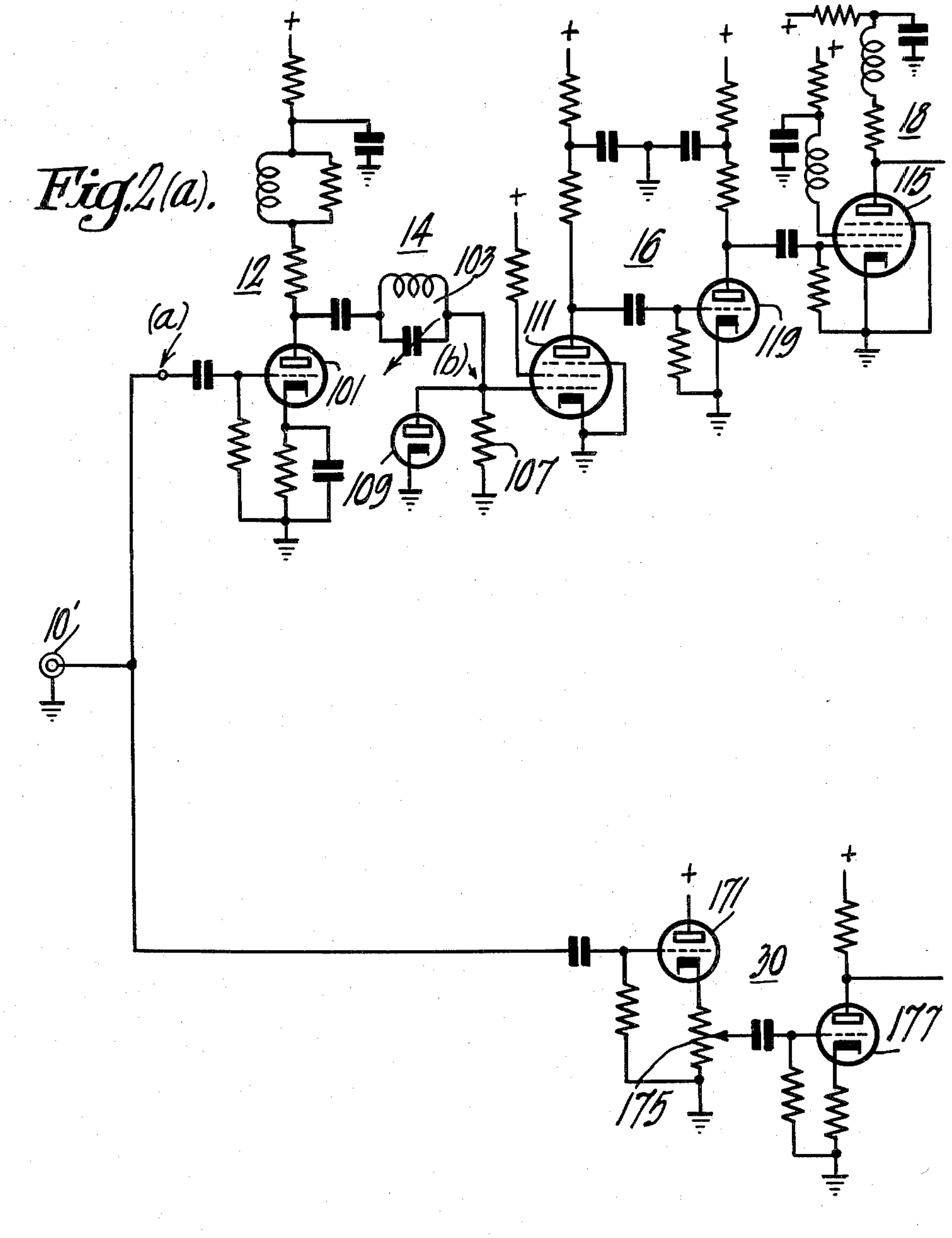
Figure 2B:
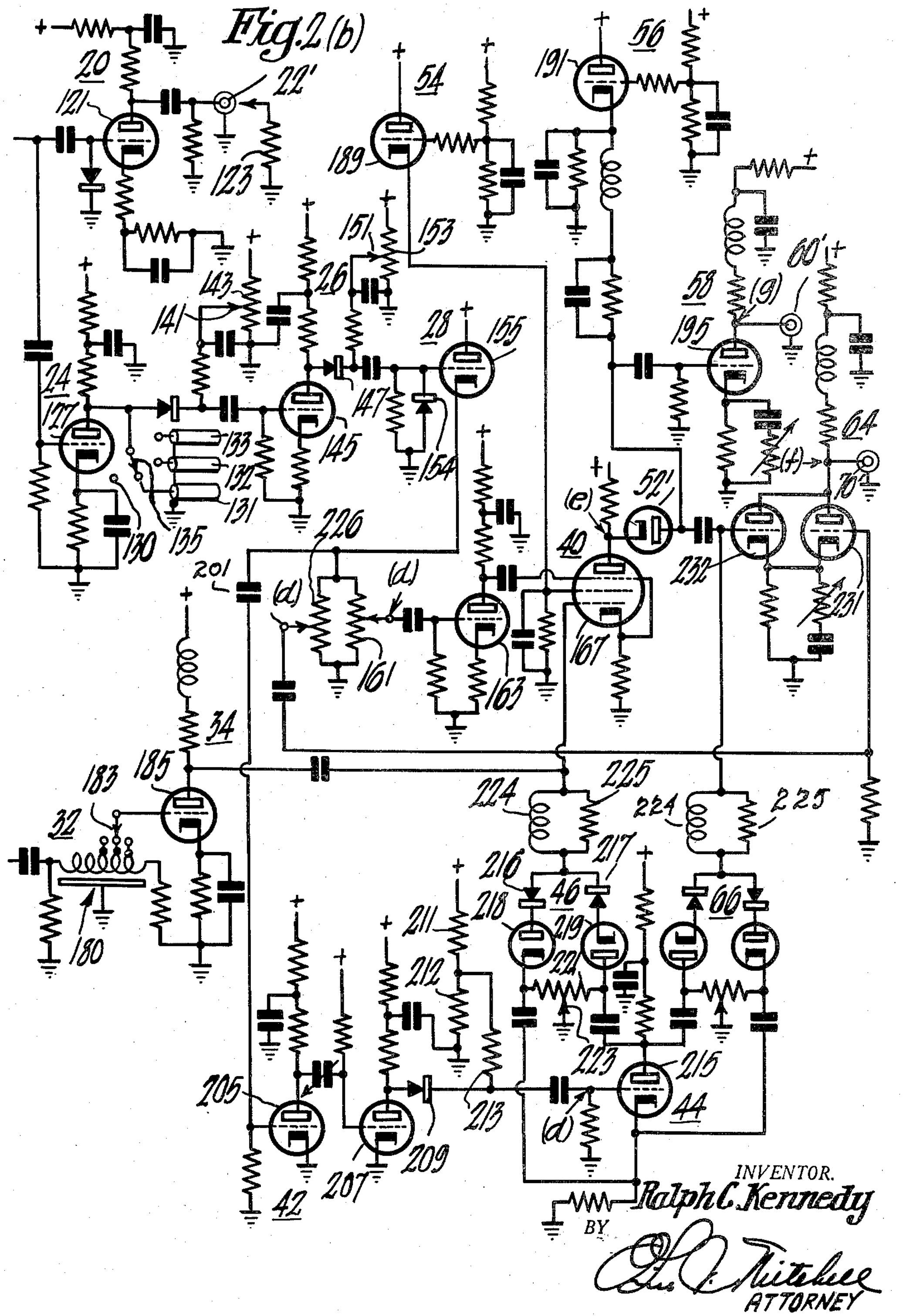

In order that the advantages of the invention may be readily obtained in practice, an express embodiment thereof, given by way of example only, is described hereinafter with reference to the accompanying drawing in which:

Figure 1 (sections *a* and *b* being taken together) is a functional diagram of a composite signal transmission system according to the invention;

Figure 2 (sections *a* and *b* being taken together) is a schematic diagram of circuitry for performing the functions outlined in Figure 1;

Figure 3 is a graphical representation of waveforms useful in an explanation of the invention; and Figure 4 is a graphical representation of waveforms obtained in the operation of the circuit schematically shown in Figure 2 according to the invention.

Referring to Figure 1, there is shown a functional diagram of a television signal transmission system of a type commonly known as a stabilizing amplifier, for translating with a black-and-white or a color composite picture signal. The composite picture signal, as received from a remotely located source, is applied to composite picture signal input terminals 10. According to the invention, the stabilizing amplifier to be described will operate with equal efficiency on monochrome or polychrome signals without requiring any adjustment or switching from one type of signal to the other. In the interest of clarity, however, the invention will be described with reference to color signals only; it being understood that the black-and-white signals will pass through the circuitry in a manner corresponding to the passage of the deflection synchronizing pulses and luminance components of the composite color signal. The composite signal is amplified in an amplifying circuit 12 and applied to a trapping circuit 14 tuned to the frequency of the color bursts to remove substantially all energy in a band of frequencies centered about the color subcarrier center frequency. The resulting signal is then applied to a deflection synchronizing pulse separating circuit 16 and the separated deflection synchronizing pulses are applied to a processing circuit 18 to restore the deflection synchronizing pulses to the proper wave shape. The proper amplitude of the restored deflection synchronizing pulses is obtained by application to a synchronizing pulse amplifying circuit 20 for presentation at processed synchronizing pulse terminals 22 to which any desired utilization circuit may be connected. The processed synchronizing pulses obtained from the processing circuit are also applied to a pulse width controlling circuit 24, a clipping circuit 26 and a gain controlling amplifying circuit 28 to produce pulses corresponding to the processed deflection synchronizing pulses. The composite picture signal applied at the input terminals 10 is also applied to a composite signal amplifying circuit 30, which determines the overall gain of the stabilizing amplifier, and delayed in time by means of a variable time delay circuit 32. The delayed signal is then applied to an amplifying and isolating circuit 34 after which the signal is applied to input terminals of a pulse adding circuit 40. The reproduced deflection synchronizing pulses are applied to other input terminals of the pulse adding circuit 40 in such manner as to reinforce the deflection synchronizing pulses of the composite signal. The gain controlling circuit 28 is adjusted to provide a clipped pulse of amplitude of the order of the color burst amplitude whereby the distortion of the received deflection synchronizing pulses presented by the composite signal amplifying circuit 34 are in effect elevated by that amplitude.

The pulse adding circuit 40 is stabilized by means of a voltage regulating circuit 42 and the direct component (D.-C.) is stabilized in the composite signal by means of a clamping circuit 44. The clamping circuit is driven by a clamp driving circuit 46 responsive to a clamping pulse obtained from a clamping pulse generating circuit 48 which is excited by the processed synchronizing pulse obtained from the gain controlling circuit 28 as shown, or from the clipping circuit 26 if desired. The reinforced composite signal is then applied to a clipping circuit 52 which is adjusted for clipping the deflection synchronizing pulses just below the amplitude of the reproduced pulses, thereby eliminating the distorted portions of the reinforced pulses and leaving a processed composite picture signal. A voltage stabilizing circuit 56 is coupled to the clipping circuit 52 to stabilize the color burst and picture signal.

The processed composite color signal is applied to an amplifying circuit 58 and is available at composite signal output terminals 60 for application to the conventional video signal switching system of the broadcast studio.

The processed composite signal is also applied to an algebraic adding circuit 64 to which processed deflection synchronizing pulses obtained from the gain controlling and amplifying circuit 28 are also applied in relative polarity at which processed deflection synchronizing pulses are cancelled from the processed composite color signal. The color burst and picture signal with processed blanking pedestals is thereby presented at the output terminals 70 for application to the conventional studio switching systems. The leading edges of the deflection synchronizing pulses are phased by adjusting the time delay circuit 32 while the trailing edges are phased by adjusting the pulse width controlling circuit 24. The gain controlling circuit 28 is adjusted to provide the proper degree of cancellation at the tip of the blanking level pedestal, or at black level, while the clipping circuit 26 insures that the blanking level is substantially constant throughout thereby leaving a clean and stable processed blanking pedestal in the resulting signal. The direct component is reinserted by means of a clamping circuit 66 coupled to the pulse adding circuit 64 and keyed by the clamp driving circuit 46.

An example of circuitry for performing the functions outlined above is shown in the schematic diagram of Figure 2. The composite color signal appearing at the input terminals 10′ is applied to a high gain amplifying circuit including a triode tube 101. The output of the high gain amplifier is applied to a resonant circuit 103 tuned to the chrominance subcarrier frequency, which is 3.58 mcs. under present standards, to remove the chrominance signal components and the color bursts. The resulting signal is applied across an input resistor 107 shunted by a D.-C. black level setting diode element 109 to the grid of a separating tube 111. The deflection synchronizing pulses appearing across the resistor 107 are translated to the processed deflection synchronizing pulse output terminals 22′ by circuitry performing three functions: (*a*) signal separation, (*b*) signal shaping, and (*c*) signal amplification. Signal separation may be accomplished by using a gating circuit of known form wherein an electron discharge device is gated in response to the received deflection synchronizing pulses to conduct substantially only during the synchronizing pulse period. This function may be also effected by applying a relatively high amplitude signal to a conventional amplifying tube operated with a low anode voltage. In this manner the effective input characteristic of the tube is limited to provide substantially on-off operation, as well known in pulse multiplex telegraph practice. In the circuit as shown, signal separation is efficiently performed by a pair of beam deflecting type tubes 111 and 115 coupled together by a signal inverting and amplifying stage having a triode tube 119. This type of beam deflecting tube is arranged so that an electron beam emanating from a cathode element is made to impinge on an anode or target electrode only when potential is applied to the control elements. In the absence of signal, the anode current is completely interrupted and a signal change of the order of two volts is sufficient to switch the tube from blocked to full conduction with a gain of the order of two to one. Input signal level variations of 14 db are handled without difficulty with the circuit arrangement shown and substantially constant amplitude output pulses are assured. The processed deflection synchronizing pulses appearing at the anode of the final separator tube 115 is applied to an amplifier stage having a triode tube 121 to produce a processed deflection synchronizing pulse output of between 4 and 5 volts for application to a utilization device having an input impedance of 75 ohms. A 75 ohm terminating resistor 123 is substituted for a utilization device in the event that there is no need for separate processed synchronizing pulse output.

The processed deflection synchronizing pulses are also applied to the grid of an amplifying and isolating tube 127 having a number of unterminated, or open circuited, delay lines of varying lengths connected to the anode by means of a switch 135. Three such lines 131, 132, and 133 are shown. With the arm of the switch 135 in contact with the unconnected terminal 130, the output pulses correspond exactly to the processed deflection synchronizing pulses. With the arm of the switch 135 selecting one of the delay lines, the reproduced pulses will have leading edges in phase with the leading edges of the processed deflection synchronizing pulses but will have the trailing edges delayed by a time period determined by the particular length of delay line selected. Thus the width controlling switch 135 is used to time the appearance of the trailing edges of pulses reproduced at the anode of the isolating tube 127. A diode element 137 is arranged to clip the bases of the reproduced pulses at a level corresponding to the potential determined by the setting of the arm 141 of a potentiometer 143. The reproduced pulses are inverted by an inverter tube 145 so that another diode element 147 clips the tips of the reproduced synchronizing pulses at a level determined by the setting of the arm 151 of a potentiometer 153. The reproduced and clipped pulses are then applied to a black level setting diode 154 and a cathode follower tube 155 which is arranged in a circuit to provide three outputs; one fixed and two adjustable in amplitude. One of the adjustable outputs is taken from a potentiometer 161 in the cathode circuit of the follower tube 155 and applied to a straight synchronizing pulse amplifying tube 163 which is arranged to inject the reproduced pulses on the cathode of a pentode adding tube 167.

The composite color signal appearing at input terminals 10′ is also applied to a cathode follower gain controlling tube 171 having a potentiometer 175 in the cathode circuit to permit adjustment of the amplitude of the composite signal to control the overall gain of the stabilizing amplifier. The composite signal is amplified by succeeding triode tube 177 and applied to the input terminals of a tapped delay line 180. The composite signal applied to the grid of the tube 185 may be varied in phase with respect to the processed deflection synchronizing pulses by means of a switch 183 used to adjust the effective delay of the composite color signal. The delayed composite signal is applied to the control grid of the adding tube 167 in such polarity that the reproduced deflection pulses applied to the cathode effectively add to or reinforce the deflection synchronizing pulses of the composite color signal. By adjusting the delay afforded by the delay line 180 the leading edges of the reproduced pulses and the deflection synchronizing pulses of the composite color signal may be made to coincide, and by adjustment of the switch 135 the trailing edges of the two pulses are made to coincide. Any distortion in the received deflection synchronizing pulses is reflected in the resultant reinforced pulses and confined to the region above the amplitude of the added reproduced pulses. A diode 52′ is coupled to the adding tube 167 to clip the reinforced pulses leaving the composite color signal with processed deflection synchronizing pulses. Precise clipping is obtained by regulating both the screen electrode and anode electrode energizing potential applied to the adding tube 167 by means of a voltage regulating tube 189 and voltage stabilizing tube 191. The composite color signal with processed deflection synchronizing pulses is applied to a composite color signal amplifying tube 195 and presented at the composite color signal output terminals 60′.

By means of a capacitor 201 the reproduced pulses are applied to an amplifying and differentiating circuit 42 comprising triode amplifying tubes 205 and 207 to produce clamping pulses. The bases of the clamping pulses are clipped by means of a diode element 209 to a level determined by the potential obtained from a voltage divider comprising resistance elements 211 and 212 and applied through the intermediary of another resistance element 213. The clipped clamping pulses are applied to a paraphase amplifier tube 215 to develop paraphase clamping pulses. The clamping pulses are applied to a conventional claming circuit comprising semiconductor diode elements 216, 217 and electron discharge clamping diodes 218, 219. A potentiometer 221 is connected to the electron discharge diodes 218 and 219 and the arm 223 connected to reference potential, shown as ground. The arm 223 is adjusted to balance the clamping circuit in conventional fashion. The semiconductor diode elements 216, 217 are interposed in the clamping circuit to isolate the control electrode of the adding tube 167 from the capacity across the electron discharge diode devices 218, 219 during the idle, or nonclamping interval, while the extremely low forward resistance of the electron discharge diode devices provides low impedance from the control electrode of the adding tube 167 to ground during the clamping interval.

The clamping pulse extends into the color burst interval for optimum clamping. In order to prevent interference with the color burst when a color signal is received, the clamping circuits 46, 66 are isolated at the burst frequency by inductors 224 having distributed capacitance and inductance resonant at the burst frequency of 3.58 mcs. Resistors 225 are shunted across the inductors 224 to provide a wide bandwidth characteristic.

The remaining output of the gain controlling circuit 28 is obtained by means of another potentiometer 226 in the cathode circuit of the cathode follower tube 155. The reproduced pulses obtained by adjustment of the arm of the potentiometer 226 are applied to the grid electrode of a triode adding tube 231 connected in parallel with another triode adding tube 232 to the grid of which the composite color signal with processed deflection synchronizing pulses is applied. The relative polarity of the pulses applied to the adding circuit 64 is such that the deflection synchronizing pulses are cancelled from the composite color signal leaving a color burst and picture signal at the terminals 70'.

Since processed deflection synchronizing pulses are first introduced in the unprocessed composite color signal to drive the received deflection synchronizing pulses above clipping level in order to remove them, it is necessary to have identical processed synchronizing pulses for cancellation. This is realized by obtaining the deflection synchronizing pulses for the two adder tubes from the same source, that is the cathode circuit of the cathode follower tube 155. A clamping circuit 66, substantially identical to the clamping circuit 46, is used to maintain the tips of the blanking pedestals at black level at the algebraic adding tube circuit 64. The processed color burst and picture signal is now in condition to enter a conventional television broadcasting studio switching system.

In the arrangement shown, the color burst appearing at the input terminals 10' remains unchanged throughout translation to the output terminals 60' and 70'. This may be assured by adjustment of the arm 223 of the clamp balancing potentiometer 221 and adjustment of the arms of the pulse addition and subtraction controls 161 and 226. It is also possible by adjusting these three controls only to vary the differential phase shift of the system in either direction to compensate for any undesirable phase shift in the color burst.

Referring to Figure 3, there are shown some representative waveforms illustrating the operation during the deflection synchronizing pulse cancelling period. The synchronizing pulse is represented by the curve 301 of Figure 3(*a*) with the broken lines 303 illustrating the usual pulse shape prior to clipping. The synchronizing pulse as shown has two different rise times; $T_1$ and $T_2$. The rise time of the leading edge $T_1$ is shorter than the rise time of the trailing edge $T_2$ and the values of these two rise times will vary depending upon many factors such as the output of the synchronizing pulse generator, the transmission path and so on. Average values will be found on the order of 0.2 $\mu$sec. and 0.3 $\mu$sec., respectively. The curve 305 of Figure 3(*b*) represents the in-phase deflection synchronizing pulse to be added to the synchronizing pulse in Figure 3(*a*). The rise time for the in-phase deflection synchronizing pulse is about 0.1 $\mu$sec. for both $T_3$ and $T_4$. The curve 307 of Figure 3(*c*) shows the result of adding the two pulses. The leading edge of the resultant pulse now has a rise of 0.2236 $\mu$sec. while that of the trailing edge is 0.3162 $\mu$sec. The result of deflection synchronizing pulse cancellation is graphically illustrated by the curve in Figure 3(*d*). Theoretically the condition of minimum ripple will occur when two pulses having identical rise times are added exactly 180 degrees of phase. Since the recovery of the deflection synchronizing pulses without changing the pulse rise times is next to impossible, the alteration of deflection synchronizing pulses is minimized by making the rise time of the processed deflection synchronizing pulses as short as possible. A practical limit on circuit complexity dictates something of the order of 0.1 $\mu$sec. The resultant signal after passing through the stabilizing amplifier circuit arrangement as shown has no observable ripple on the deflection synchronizing pulses.

In Figure 4 there are graphical representations of a test signal passing through the stabilizing amplifier circuit according to the invention. In Figure 4(*a*) there is shown a color bar test signal as applied to the input terminals 10 at the point (*a*) on the diagram of Figure 2. Figure 4(*b*) shows the composite signal at the point (*b*) after passing through the chrominance signal trap 14 leaving only deflection synchronizing pulses. Figure 4(*c*) illustrates a processed deflection synchronizing pulse at the output terminals 22'. The pulses obtained at the cathode follower tube 155 for the switch 135 on the contact 130 are the same with respect to time;

the amplitudes differing according to adjustment of the gain controls. Figure 4(*d*) represents the clamp pulse as applied to the grid of the paraphase amplifying tube 215. The clamping pulse should begin just after the trailing edge of the deflection synchronizing pulse and extend for the duration of the color burst. Figure 4(*e*) illustrates the reinforced pulse obtained at the anode of the adding tube 167. The reinforcing reproduced pulse is reflected in the portion 415 and the received deflection synchronizing pulse is reflected in the portion 417. The line 419 represents the clipping level of the diode 52', at the output of which is presented only the signal appearing below the line 419. The color burst and picture signal with processed blanking pedestals is represented by the curve of Figure 4(*f*) while the composite color signal with processed deflection synchronizing pulses is shown in Figure 4(*g*).

Those skilled in the art will determine from the teachings herein the proper values of components to be used in applying the invention to practice, however, the values listed below, which were used in a stabilizing amplifier constructed as shown in the schematic diagrams of Figure 2 are offered as a convenient guide.

| Ref. No. | Component | Type or Value |
|---|---|---|
| 101 | High gain amplifier tube | 417-A. |
| 103 | Resonant circuit | 3.58 mc./s., 150 Q. |
| 107 | Grid resistor | 270 ko. |
| 109 | Level setting diode | ½ 6AL5. |
| 111 | Separating tube | 6BN6. |
| 115 | Separating tube | 6BN6. |
| 119 | Pulse amplifying tube | 12AT7 (par.). |
| 121 | Pulse amplifying tube | 5,687 (par.). |
| 123 | Terminating resistor | 75 ohms. |
| 127 | Amplifying Tube | ½ 12AU7. |
| 137 | Diode base clipping element | 1N34. |
| 145 | Inverting Tube | ½ 12AU7. |
| 147 | Diode tip clipping element | 1N34. |
| 155 | Cathode follower tube | 12AT7 (par.). |
| 161 | Potentiometer | 1,000 ohms. |
| 163 | Amplifier tube | ½ 6U8. |
| 167 | Adding tube | ½ 6U8. |
| 171 | CF gain controlling tube | 12AU7 (par.). |
| 177 | Amplifying tube | 417A. |
| 185 | Isolating and amplifying tube | 12AT7 (par.). |
| 189 | Regulating tube | ½ 6BQ7. |
| 191 | Stabilizing tube | ½ 6BQ7. |
| 195 | Coupling signal amplifying tube | 12AU7 (par.). |
| 205, 207 | Amplifying and differentiating tube | 12AX7. |
| 209 | Diode clamping pulse base clipping element. | 1N34. |
| 215 | Paraphase amplifier tube | ½ 5687. |
| 216, 217 | Semiconductor diodes | 1N100. |
| 218, 219 | Vacuum diodes | 6AL5. |
| 221 | Balancing potentiometer | 0.5 Mo. |
| 231, 232 | Algebraic adding tubes | 12AU7. |

The power supply delivered 285 volts positive between the points marked with a plus (+) sign and the point of neutral potential, shown as ground.

The invention claimed is:

1. A television signal transmission system including, a composite picture signal input circuit to which a composite picture signal is applied, a composite picture signal output circuit at which is available an amplified and processed composite picture signal corresponding to the applied composite picture signal, means coupled to said input circuit for separating the deflection synchronizing pulses from said applied signal, means coupled to said separating means for varying the time duration of said separated deflection synchronizing pulses, means coupled to said time varying means for clipping the varied pulses, means coupled to said input circuit for adjusting the phase of the applied composite signal with respect to said separated deflection synchronizing pulses, means coupled to said clipping means and to said phase adjusting means for adding said clipped pulses to said delayed composite signal effectively to reinforce the deflection synchronizing pulses from said delayed signal with said clipped pulses, means coupled to said adding means for clipping said reinforced deflection synchronizing pulses to produce a composite picture signal with processed synchronizing pulses, and means coupling the last said clipping means to said composite picture signal output circuit.

2. A television signal transmission system including, a composite picture signal input circuit to which a composite picture signal is applied, a picture signal output circuit at which is available an amplified and processed picture signal corresponding to the picture components of the applied composite picture signal, means coupled to said input circuit for separating the deflection synchronizing pulses from said applied signal, means coupled to said separating means for varying the time duration of said separated deflection synchronizing pulses, means coupled to said varying means for clipping the varied pulses, means coupled to said input circuit for adjusting the phase of the applied composite signal with respect to said separated deflection synchronizing pulses, means coupled to said clipping means and to said phase adjusting means for adding said clipped pulses to said delayed composite signal effectively to reinforce the deflection synchronizing pulses from said delayed signal with said clipped pulses, means coupled to said adding means for clipping said reinforced deflection synchronizing pulses to produce a composite picture signal with processed synchronizing pulses, means coupled to both of said clipping means for subtracting the clipped pulses from the composite picture signal to remove said synchronizing pulses thereby to leave a picture signal with processed blanking pedestals, and means coupling said subtracting means to said picture signal output circuit.

3. A color television signal transmission system including, a composite color signal input circuit to which a composite color signal is applied, a composite color signal ouput circuit at which is available an amplified and processed composite color signal corresponding to the applied composite color signal, means coupled to said input circuit for separating the deflection synchronizing pulses from said applied signal, means coupled to said separating means for varying the timing of the trailing edges of said separated deflection synchronizing pulses, means coupled to said timing means for clipping the time-varied pulses, means coupled to said input circuit for delaying the applied composite signal, means coupled to said clipping means and to said delaying means for adding said clipped pulses to said delayed composite signal effectively to elevate the deflection synchronizing pulses of said delayed signal to a level substantially above the color bursts, means coupled to said adding means for clipping said elevated deflection synchronizing pulses substantially at said level above said color bursts to produce a composite color signal with processed deflection synchronizing pulses whereby the color bursts are undistorted by said clipping means, and means coupling the last said clipping means to said composite color signal output circuit.

4. A color television signal transmission system including, a composite color signal input circuit to which a composite color signal is applied, a color burst and picture signal output circuit at which is available an amplified and processed color signal corresponding to the color burst and picture component of the applied composite color signal, means coupled to said input circuit for separating the deflection synchronizing pulses from said applied signal, means coupled to said separating means for varying the timing of the trailing edges of said separated deflection synchronizing pulses, means coupled to said timing means for clipping the time-varied pulses, means coupled to said input circuit for delaying the applied composite signal, means coupled to said clipping means and to said delaying means for adding said clipped pulses to said delayed composite signal effectively to elevate the deflection synchronizing pulses of said delayed signal to a level substantially above the color bursts, means coupled to said adding means for clipping said elevated deflection synchronizing pulses substantially at said level above said color bursts to produce a composite color signal with processed deflection synchronizing pulses, means coupled to both of said clipping means for subtracting the clipped pulses from said composite color signal to remove said deflection synchronizing pulses from said composite color signal thereby to leave a color burst and picture signal with processed blanking pedestals, and means coupling said subtracting means to said color burst and picture signal output circuit.

5. A television signal transmission system including, a composite picture signal input circuit to which a composite picture signal is applied, a synchronizing pulse output circuit, a video signal output circuit and a composite picture signal output circuit, means coupled to said input circuit for separating the deflection synchronizing pulses from said applied signal, means coupled to said separating means for shaping said synchronizing pulses, means coupling said last named means to said synchronizing pulse output circuit, means coupled to said separating means for varying the time duration of said separated deflection synchronizing pulses, means coupled to said time varying means for clipping the varied pulses, means coupled to said input circuit for adjusting the phase of the applied composite signal with respect to said separated deflection synchronizing pulses, means coupled to said clipping means and to said phase adjusting means for adding said clipped pulses to said delayed composite signal effectively to reinforce the deflection synchronizing pulses from said delayed signal with said clipped pulses, means coupled to said adding means for clipping said reinforced deflection synchronizing pulses to produce a composite picture signal with processed synchronizing pulses, means coupling the last said clipping means to said composite picture signal output circuit at which is available an amplified and processed composite picture signal corresponding to the applied composite picture signal, and means coupling said last named clipping means and said first named clipping means to said video output circuit.

References Cited in the file of this patent

UNITED STATES PATENTS

| | | |
|---|---|---|
| 2,212,199 | Browne et al. | Aug. 20, 1940 |
| 2,286,450 | White et al. | June 16, 1942 |
| 2,727,942 | Jury | Dec. 20, 1955 |
| 2,793,246 | Olive et al. | May 21, 1956 |